(12) United States Patent
Takizawa (10) Patent No.: US 6,188,791 B1
(45) Date of Patent: *Feb. 13, 2001

(54) IMAGE PROCESSING APPARATUS

(75) Inventor: Hiroshi Takizawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/753,687

(22) Filed: Nov. 27, 1996

Related U.S. Application Data (63) Continuation of application No. 08/323,113, filed on Oct. 14, 1994, now abandoned.

(30) Foreign Application Priority Data

Oct. 15, 1993 (JP) ..................................................... 5-281645

(51) Int. Cl.[7] .................................................. G06K 9/36
(52) U.S. Cl. ........................... 382/232; 382/246; 386/109
(58) Field of Search .................................. 382/232, 246, 382/251; 348/403, 419, 405; 350/133; 381/34; 386/109, 124

(56) References Cited

U.S. PATENT DOCUMENTS

| | | | |
|---|---|---|---|
| 4,534,055 | * 8/1985 | Iinuma ..................................... | 381/34 |
| 4,603,347 | * 7/1986 | Kuroda .................................... | 358/13 |
| 4,729,020 | * 3/1988 | Schaphorst et al. .................. | 358/133 |
| 5,109,451 | * 4/1992 | Aono et al. ............................. | 382/56 |
| 5,272,528 | * 12/1993 | Juri et al. ............................... | 382/56 |
| 5,329,375 | * 7/1994 | Juri et al. ............................. | 386/124 |
| 5,349,384 | * 9/1994 | Oguro .................................... | 348/405 |
| 5,351,131 | * 9/1994 | Nishino et al. ....................... | 386/109 |
| 5,398,067 | * 3/1995 | Sakamoto ............................. | 348/403 |

* cited by examiner

Primary Examiner—Jose L. Couso
Assistant Examiner—Anh Hong Do
(74) Attorney, Agent, or Firm—Fitzpatrick, Cella, Harper & Scinto (57) ABSTRACT

An image processing apparatus includes an input device for inputting image data, a coder for variable-length-coding the image data input by the input device, and an adder for adding sync information as to the location of an image sync signal in the image data to the variable-length-coded image data. The invention also relates to an image processing apparatus for reproducing variable-length-coded image data with which sync information indicating the location of the image sync signal of the image data is transmitted. The apparatus includes a decoder for decoding the variable-length-coded image data, a detector for detecting the sync information indicating the location of an image sync signal, and an output device for outputting the image data decoded by the decoder in accordance with an output from the detector.

11 Claims, 5 Drawing Sheets

IMAGE PROCESSING APPARATUS

This application is a continuation application of application Ser. No. 08/323,113 filed Oct. 14, 1994, now abandoned.

BACKGROUND OF THE INVENTION

1. Field of the Invention

The present invention relates to an image processing apparatus and, more particularly, to instantaneous reproduction of variable-length-coded image data.

2. Description of the Related Art

An image coding apparatus for quantizing input image data and variable-length-coding the quantized image data so as to correspond to a transmission speed is conventionally known.

Figure 1:
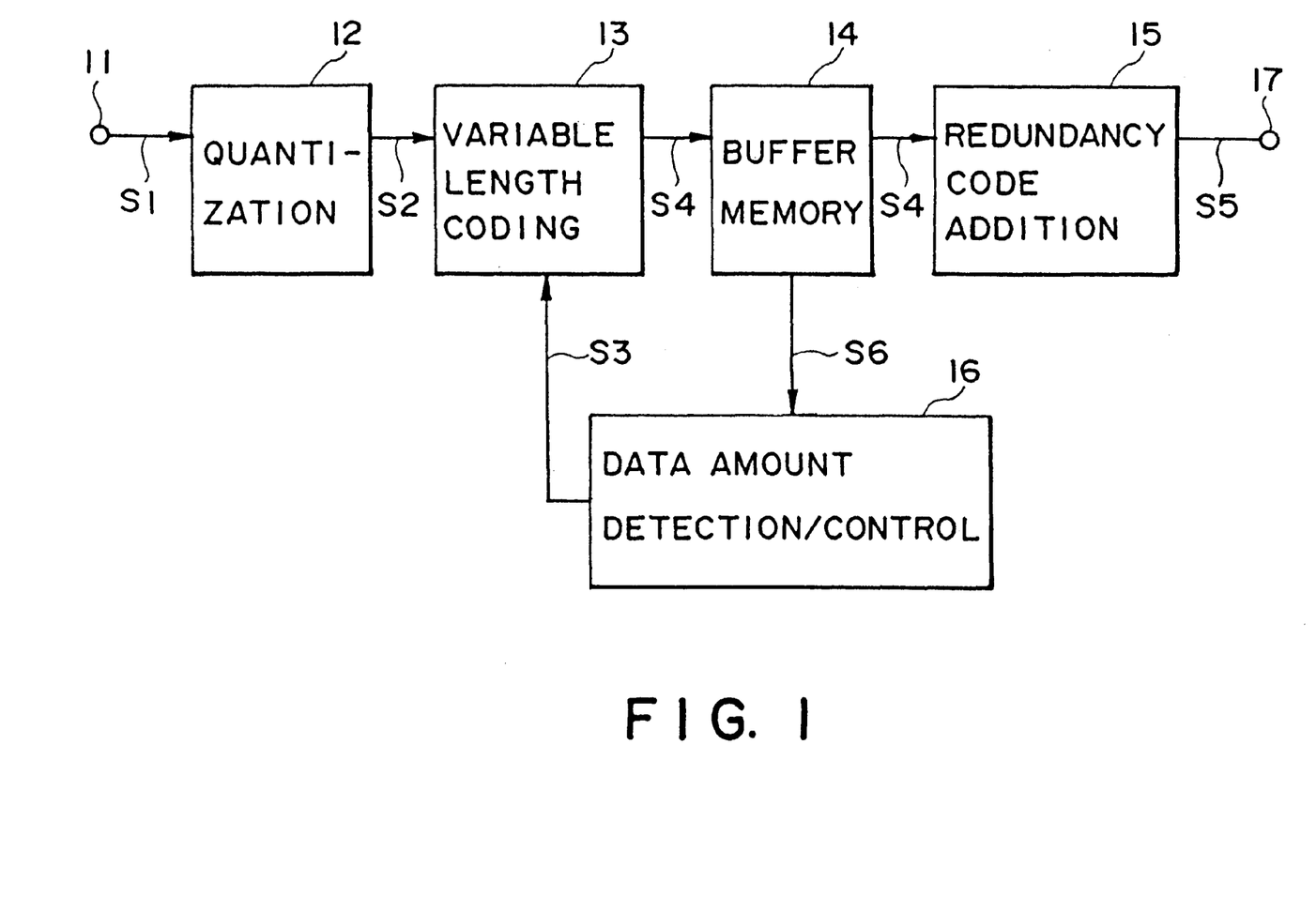
FIG. 1 is a block diagram of a conventional image coding apparatus.

FIG. 1 is a block diagram showing an image coding apparatus for performing variable length coding by controlling the data amount to be generated during a next unit time T (s) in accordance with a generated data amount N [bits] per unit time T [s].

The image coding apparatus shown in FIG. 1 comprises a quantization circuit 12, a variable length coding circuit 13, a buffer memory 14, a redundancy code addition circuit 15, and a data amount detection/control circuit 16. Image data S1 input from an input terminal 11 is converted into quantized data S2 by the quantization circuit 12. This quantized data S2 is supplied to the variable length coding circuit 13 and is coded into data having a target data amount in accordance with a coding parameter S3 supplied from the data amount detection/control circuit 16.

Coded data S4 is temporarily stored in the buffer memory 14, and then added with an error correction code, a transmission sync signal, a control code, and the like in the redundancy code addition circuit 15. The resultant data is output as redundancy-code-added data S5 from an output terminal 17.

The data amount detection/control circuit 16 outputs the coding parameter S3 on the basis of a detection signal S6 for detecting the amount of data stored in the buffer memory 14 and determines the target data amount of the coded data S4 output from the variable length coding circuit 13.

Figure 2:
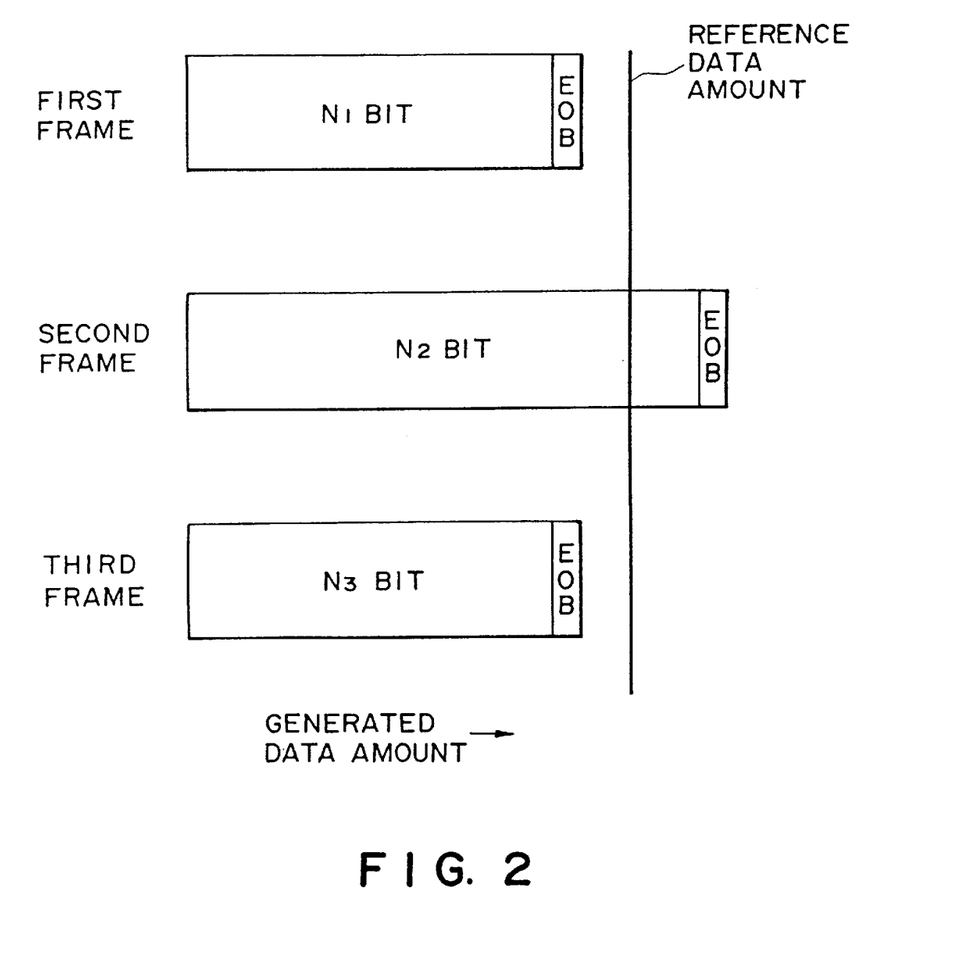
FIG. 2 is a view for explaining the data amount of one frame which is generated by variable length coding.

FIG. 2 is a view showing the data amount generated when the image coding apparatus in FIG. 1 controls the generated data amount using one frame time as the unit time T [s].

For example, if data amounts generated during the frame times [s] of the first to nth frames are defined as $N_1$ to $N_n$, [bits], respectively, the generated data amount is controlled such that m frames have a data amount which is m times a reference data amount [(total transmission amount - redundancy data amount)/frame count per second]. FIG. 2 exemplifies a case for m=3. The data amount of the first frame is $N_1$ [bits]; the data amount of the second frame, $N_2$; and the data amount of the third frame, $N_3$. As can be apparent from FIG. 2, when data amount control of the image data is performed as described above, the data amounts of the respective frame images are not equal to each other.

When variable-length-coded image data as described above is to be received and decoded, an implementation for reproducing the sync frequency of an image signal is required at the receiving end because the transmission clock frequency which determines the transmission speed is asynchronous with the sync frequency of the image signal.

More specifically, as shown in FIG. 2, a data end code (EOB) is added to the end of the image data of each frame, the EOB is detected at the receiving end, and the reproduction sync frequency at the transmitting end is reproduced in accordance with a phase-locked loop using the frame frequency as a reference.

According to this method, however, the variable range of data amount control at the transmitting end cannot be widened because limitations are imposed by the lock range of the phase-locked loop.

In above method the convergence time of the phase-locked loop is long because the frame frequency serves as a reference. Therefore, the method cannot instantaneously cope with trouble caused by the hit of a sync signal or the like.

SUMMARY OF THE INVENTION

The present invention has been made in consideration of the above situation and has as its object to provide an image processing apparatus capable of instantaneously reproducing an image sync frequency of the transmitting end at the receiving end even if the image data amount generated in each frame greatly varies.

In order to achieve the above object, according to an aspect of the present invention, there is provided an image processing apparatus comprising input means for inputting image data, coding means for performing variable length coding of the image data input from the input means, and addition means for adding frequency information of an image sync signal of the image data to the variable-length-coded image data.

In order to achieve the above object, according to another aspect of the present invention, there is provided an image processing apparatus for reproducing variable-length-coded image data with which frequency information of an image sync signal of the image data is transmitted, comprising decoding means for decoding the variable-length-coded image data, detection means for detecting the frequency information of the transmitted image sync signal, and reproduction means for reproducing the image sync signal in accordance with an output from the detection means.

Other objects, features and advantages of the invention will become apparent from the following detailed description taken in conjunction with the accompanying drawings.

DETAILED DESCRIPTION OF THE PREFERRED EMBODIMENT

The preferred embodiment of the present invention will be described below with reference to the accompanying drawings.

Figure 3:
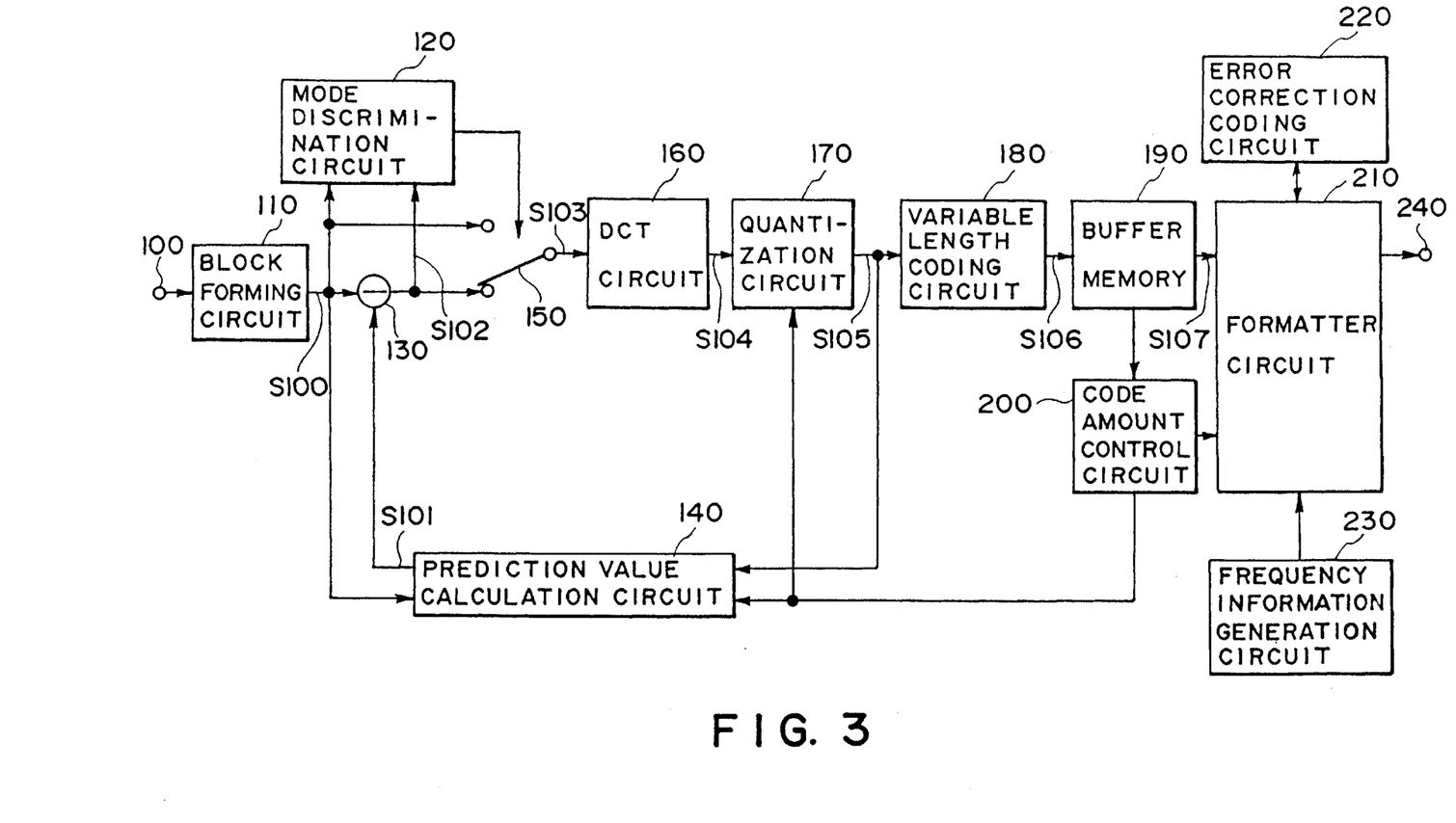
FIG. 3 is a block diagram of an image coding apparatus according to an embodiment of the present invention.

FIG. 3 is a block diagram of an image coding apparatus for controlling the data amount to be generated during a next unit time T [s] to variable-length-code an image in accordance with a generated data amount N [bits] per unit time T [s].

Figure 4:
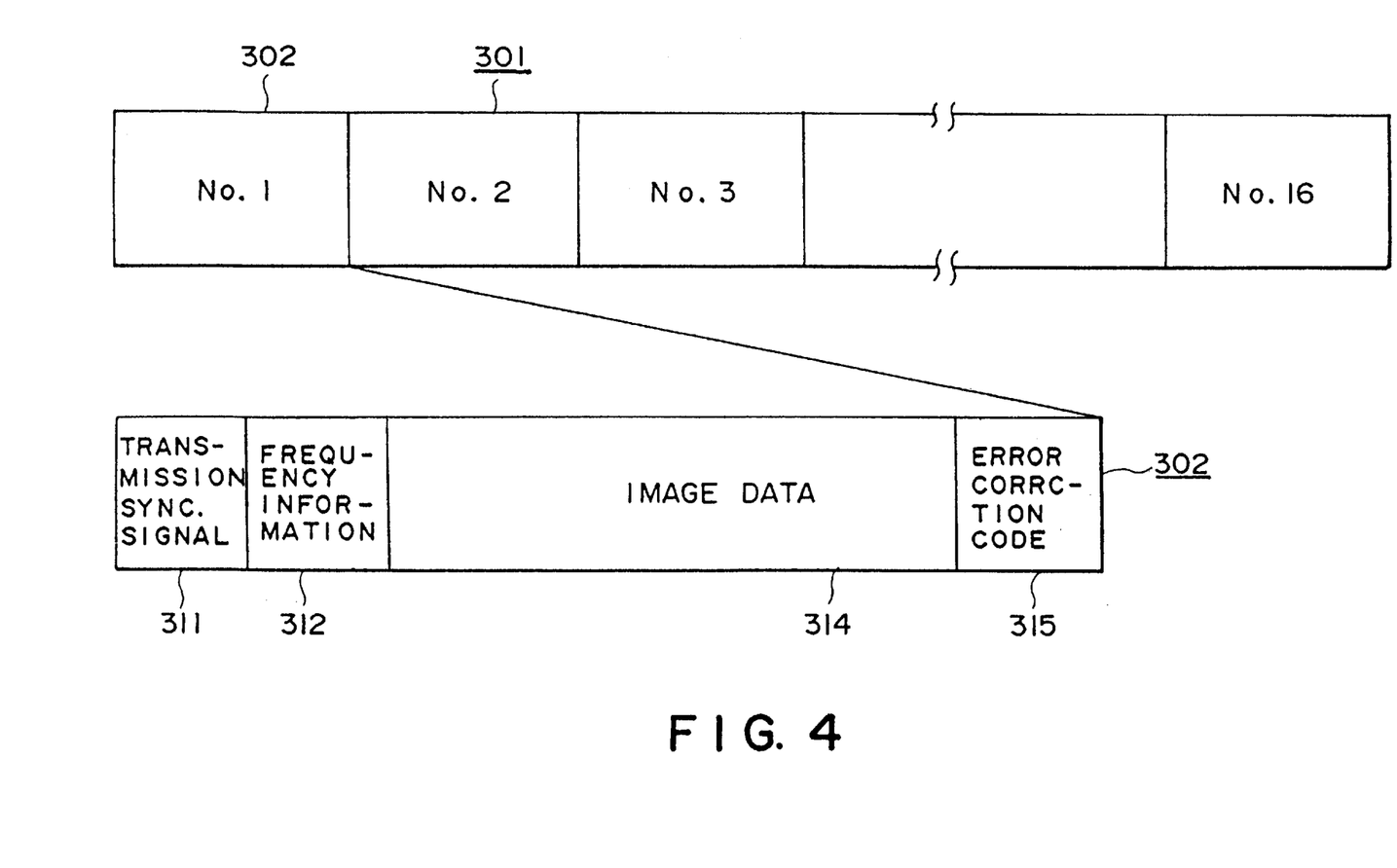
FIG. 4 is a block diagram showing the arrangement of a transmission frame according to the embodiment.

FIG. 4 is a view showing the arrangement of a transmission frame according to this embodiment.

A data transmission format according to this embodiment is constituted by unit transmission frames 301 obtained by dividing a total transmission code amount N [bits] per second by n. The data amount of the unit transmission frame 301 is N/n [bits]. Each unit transmission frame 301 is constituted by small transmission blocks 302 obtained by dividing each unit transmission frame by 16. Each small transmission block 302 comprises a transmission sync signal 311, image frequency information 312, coded image data 314, and an error correction code 315.

Referring to FIG. 3, a digital image signal input from an input terminal 100 is formed into blocks by a block forming circuit 110. Each block consists of 8×8 pixels.

The block forming circuit 110 also forms the input digital image signal into block data S100 (to be referred to as macroblocks S100 hereinafter) each serving as a coding process unit consisting of 16×16 pixels. The macroblock S100 is supplied to a mode discrimination circuit 120, an operation circuit 130, and a prediction value calculation circuit 140.

The mode discrimination circuit 120 calculates the data powers of the macroblock data S100 and difference value data S102 obtained by subtracting prediction data S101 generated by the prediction value calculation circuit 140 from the macroblock data S100 output from the operation circuit 130. A switch 150 selects macroblock data S103 having a lower power (i.e., data having a smaller generated information amount). The data S103 is then supplied to a DCT (Discrete Cosine Transform) circuit 160.

When the following coding is performed using the macroblock data S100, intraframe coding is performed. When the following coding is performed using the difference value data S102, interframe coding is performed.

In units of blocks (8×8), the DCT circuit 160 performs DCT of the data S103 selected by the mode discrimination circuit 120.

DCT data S104 is quantized by a quantization circuit 170, and quantized data S105 is output.

The quantized data S105 is input to a variable length coding circuit 180.

In the variable length coding circuit 180, the amounts of data generated in units of macroblocks are different from each other because the input data is variable-length-coded.

Therefore, a coded data amount obtained by coding one-frame image data in one frame is different from that in another frame.

Coded data S106 from the variable length coding circuit 180 is supplied to a buffer memory 190.

A code amount control circuit 200 detects the data occupancy rate of the buffer memory 190 and feeds back the data occupancy rate to the quantization circuit 170 and an inverse quantization circuit (not shown) in the prediction value calculation circuit 140, thereby controlling the quantization step. That is, the quantization step is controlled such that the data occupancy rate is set at an occupancy rate within a predetermined range.

Output data S107 from the buffer memory 190 is supplied to a formatter circuit 210.

The formatter circuit 210 forms a transmission frame (FIG. 4) for the output data S107 output from the buffer memory 190 and outputs the transmission frame from an output terminal 240.

The transmission sync signal 311 (a sync signal for block synchronization) shown in FIG. 4 is generated inside the formatter circuit 210.

The formatter circuit 210 receives an error correction code generated by an error correction coding circuit 220 for the coded image data.

The formatter 210 also receives the frequency information of the image sync signal which is generated by a frequency information generation circuit 230.

The frequency information of the image sync signal represents a leading edge position (position along the time base) of an image frame frequency signal or a signal (to be referred to as a 30·k (where k is an integer) signal hereinafter) having a frequency of 30·k and phase-locked at a frequency k times a frequency of 30 Hz.

In this case, the condition n/N<1/(30·k) is satisfied. The 30·k frequency signal is used since the image data has a frame frequency of 30 Hz. For example, if the frame frequency is 25 Hz, a 25·k frequency signal is used.

The contents of the frequency information of this image sync signal are determined upon a comparison between the unit transmission frame and the image frame frequency or 30·k signal as a function of time as follows.

(1) One bit is assigned to indicate whether a leading edge of a clock of the image frame frequency signal or the 30·k frequency signal is present within the unit transmission frame 301.

(2) One bit is assigned to indicate whether the signal present within the unit transmission frame 301 is the image frame frequency signal or the 30·k frequency signal.

(3) Four bits are assigned to indicate a specific leading edge position, as to one of 16 small transmission blocks No. 1 to No. 16 in the unit transmission frame 301, of the clock of the image frame frequency signal or the 30·k frequency signal present within the unit transmission frame 301.

A total of six bits as described above are inserted into the frequency information 312 area of the image sync signal in the small transmission block 302, and the resultant frame is transmitted.

A decoding apparatus for decoding data coded by the coding apparatus shown in FIG. 3 and transmitted to a receiving end will be described with reference to FIG. 5.

Figure 5:
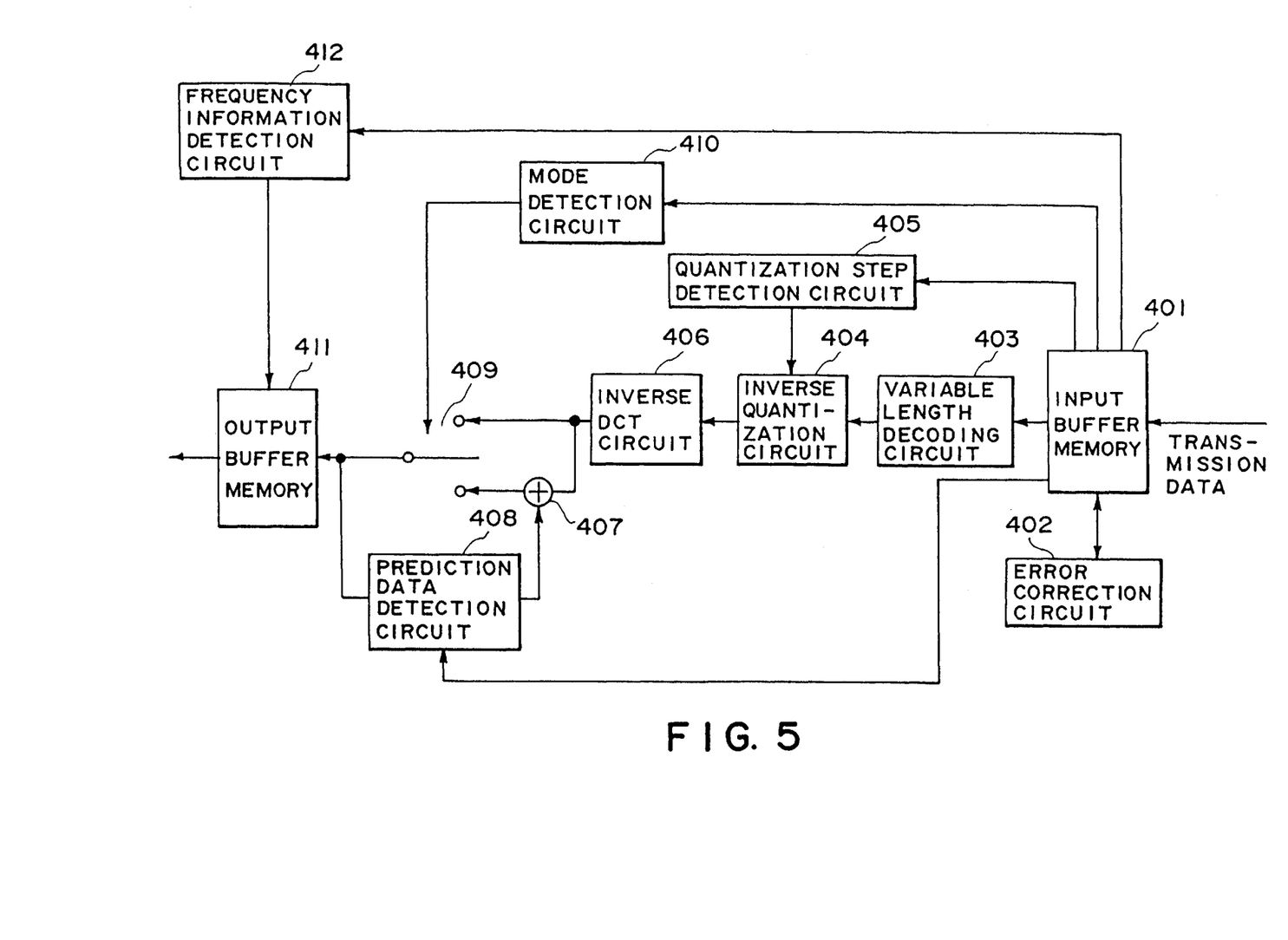
FIG. 5 is a block diagram of an image decoding apparatus according to the embodiment of the present invention.

Referring to FIG. 5, transmitted data is stored in an input buffer memory 401 in accordance with the transmission sync signal 311 (FIG. 4) added to the transmitted data.

After the transmitted data is stored in the input buffer memory 401, a data transmission error of the stored data is corrected by an error correction circuit 402.

The error correction circuit 402 performs error correction on the basis of an error correction code 315 (FIG. 4) transmitted together with the image data.

The error-corrected image data is supplied to a variable length decoding circuit 403, which then performs variable length decoding.

The image data decoded by the variable length decoding circuit 403 is supplied to an inverse quantization circuit 404.

The inverse quantization circuit 404 performs inverse quantization on the basis of quantization step information output from a quantization step detection circuit 405.

The quantization step detection circuit 405 detects quantization step information transmitted together with the image data and outputs the quantization step information.

The inversely quantized data is supplied to an inverse DCT circuit 406 and is subjected to inverse DCT.

The inverse DCT image data is input to an addition circuit 407. The addition circuit 407 adds the image data output from a prediction data detection circuit 408 and the image data output from the inverse DCT circuit 406.

A switch 409 switches between the image data output from the addition circuit 407 and the image data output from the inverse DCT circuit 406 in accordance with an output from a mode detection circuit 410 and outputs the selected data to an output buffer memory 411.

The mode detection circuit 410 detects information associated with a coding mode transmitted together with the image data and controls the switch 409 on the basis of this detection result.

The prediction data detection circuit 408 detects motion information transmitted together with the image data and generates prediction data.

The output buffer memory 411 outputs the image data in synchronism with the image sync signal.

The output buffer memory 411 receives information associated with the image sync signal output from a frequency information detection circuit 412 and outputs the image data on the basis of this information.

The frequency information detection circuit 412 detects the frequency information 312 (FIG. 4) transmitted together with the image data to instantaneously obtain an image sync signal matching the transmitted image data.

As described above, at the receiving end for receiving transmitted data, the frequency information 312 is detected, and the image frame frequency signal is instantaneously reproduced by a phase-locked loop having 30·k [Hz] as a reference frequency.

In addition, an image signal phase-locked with respect to the transmitting end can be reproduced because the leading edge position of the image frame frequency signal is clear.

Various changes and modifications may be made without departing from the spirit and scope of the present invention.

For example, the unit transmission frame 301 is divided into 16 small blocks in the above embodiment in FIG. 4. However, the number of blocks and the insertion position of the frequency information of the image sync signal are not limited to the ones described in the above embodiment.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) an inputter, arranged to input image data;
   b) an encoder, adapted to encode, using variable length coding, the image data input via the inputter;
   c) a divider, adapted to divide the variable-length-coded image data into blocks based upon a unit basis of predetermined data amount; and
   d) a data adder, arranged to discriminate whether or not a position in a time base of an image sync signal of the image data lies within the block data, and to add to the block data divided by said divider, addition data representing the discrimination result.

2. An apparatus according to claim 1, further comprising a transmitter, adapted to transmit the image data to which the data is added by said data adder.

3. An apparatus according to claim 1, wherein said encoder comprises:
   a) a block former, adapted to form the image data into blocks;
   b) an orthogonal transformer, adapted to orthogonally transform the block-formed image data; and
   c) a quantizer, adapted to quantize the orthogonally transformed image data.

4. An apparatus according to claim 1, wherein said encoder performs the variable length coding in accordance with a transmission speed.

5. An apparatus according to claim 1, wherein the image sync signal is a horizontal sync signal or a vertical sync signal.

6. An image processing apparatus comprising:
   a) an inputter, adapted to input variable-length-coded image data divided into block data based upon a unit basis of predetermined data amount, said inputter inputting addition data representing whether or not a position in a time base of an image sync signal of the image data lies within the block data;
   b) a decoder. adapted to decode the variable-length-coded image data;
   c) a detector, adapted to detect the addition data; and
   d) an outputter, arranged to output the image data decoded by said decoder in accordance with an output from said detector.

7. An apparatus according to claim 6, wherein the image sync signal is a horizontal sync signal or a vertical sync signal.

8. An image processing apparatus comprising:
   a) an inputter, adapted to input image data;
   b) an encoder, adapted to encode, using variable length coding, the image data input by said inputter;
   c) a divider, adapted to divide the variable-length-coded image data into a plurality of blocks; and
   d) a data adder, adapted to discriminate whether or not a position in a time base of an image sync signal of the image data lies within the block data, and to add to the block data divided by said divider, addition data representing the discrimination result.

9. A method of processing image data comprising the steps of:
   a) inputting image data;
   b) variable length coding the image data input in said inputting step;
   c) dividing the variable-length-coded image data into blocks based upon a unit basis of predetermined data amount; and
   d) discriminating whether or not a position in a time base of an image sync signal of the image data lies within the block data, and adding to the block data divided in said dividing step, addition data representing the discrimination result.

10. A method of processing image data comprising the steps of:
   a) inputting variable-length-coded image data divided into block data based upon a unit basis of predetermined data amount, said inputting step inputting addition data representing whether or not a position in a time base of an image sync signal of the image data lies within the block data;
   b) decoding the variable-length-coded image data;
   c) detecting the addition data; and d) outputting the image data decoded in said decoding step in accordance with an output obtained in said detecting step.

11. A method of processing image data comprising the steps of:
   a) inputting image data;
   b) variable length coding the image data input in said inputting step;
   c) dividing the variable-length-coded image data into a plurality of blocks; and
   d) discriminating whether or not a position in a time base of an image sync signal of the image data lies within the block data, and adding to the block data divided in said dividing step, addition data representing the discrimination result.

* * * * *

UNITED STATES PATENT AND TRADEMARK OFFICE
CERTIFICATE OF CORRECTION

PATENT NO. : 6,188,791 B1
DATED : February 13, 2001
INVENTOR(S) : Takizawa

Page 1 of 1

It is certified that error appears in the above-identified patent and that said Letters Patent is hereby corrected as shown below:

<u>Column 1,</u>
Line 48, "$N_n$," should read -- $N_n$ --; and
Line 52, at "FIG.2 . . ." should begin a new paragraph.

<u>Column 6,</u>
Line 21, "decoder." should read -- decoder, --.

Signed and Sealed this

Twenty-sixth Day of February, 2002

Attest:

*Attesting Officer*

JAMES E. ROGAN
*Director of the United States Patent and Trademark Office*